US008553278B2

(12) United States Patent
Mori

(10) Patent No.: US 8,553,278 B2
(45) Date of Patent: Oct. 8, 2013

(54) METHOD OF GENERATING COMBINED LOOK-UP TABLE, AND IMAGE PROCESSING APPARATUS AND IMAGE FORMING APPARATUS

(75) Inventor: Hiroshi Mori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 785 days.

(21) Appl. No.: 11/947,199

(22) Filed: Nov. 29, 2007

(65) Prior Publication Data

US 2008/0151276 A1      Jun. 26, 2008

(30) Foreign Application Priority Data

Dec. 21, 2006  (JP) ................................. 2006-344667

(51) Int. Cl.
*G06F 15/00*   (2006.01)
*H04N 1/40*    (2006.01)
*G06K 9/00*    (2006.01)
*G09G 5/02*    (2006.01)

(52) U.S. Cl.
USPC ............ 358/1.9; 358/3.23; 382/167; 345/603

(58) Field of Classification Search
None
See application file for complete search history.

(56) References Cited

U.S. PATENT DOCUMENTS

| | | | | |
|---|---|---|---|---|
| 5,481,655 A * | 1/1996 | Jacobs | ............................ | 358/1.9 |
| 5,793,501 A * | 8/1998 | Murakami | ..................... | 358/520 |
| 6,919,975 B1 * | 7/2005 | Haikin et al. | .................. | 358/518 |
| 7,184,057 B2 * | 2/2007 | Stokes et al. | .................. | 345/600 |
| 7,477,415 B2 | 1/2009 | Kondo et al. | ................. | 358/1.16 |
| 7,586,657 B2 * | 9/2009 | Ohga | ............................. | 358/518 |
| 7,859,718 B2 * | 12/2010 | Miyazaki | ........................ | 358/1.9 |
| 8,018,620 B2 * | 9/2011 | Jung | ............................... | 358/1.9 |
| 8,270,028 B2 * | 9/2012 | Mahy et al. | ..................... | 358/1.9 |
| 2002/0163669 A1 * | 11/2002 | Yamazaki et al. | ............ | 358/3.23 |
| 2003/0202197 A1 | 10/2003 | Saito et al. | ..................... | 358/1.9 |
| 2003/0210414 A1 * | 11/2003 | Kuno | ............................... | 358/1.9 |
| 2003/0214686 A1 * | 11/2003 | Saito et al. | ..................... | 358/504 |
| 2005/0195453 A1 * | 9/2005 | Asano | ............................ | 358/523 |
| 2006/0050033 A1 | 3/2006 | Asao et al. | ....................... | 345/88 |

FOREIGN PATENT DOCUMENTS

| | | |
|---|---|---|
| JP | 09-294212 | 11/1997 |
| JP | 11-306334 | 11/1999 |
| JP | 2003-338938 | 11/2003 |
| JP | 2005-039290 | * 2/2005 |
| JP | 2005-260777 | 9/2005 |
| JP | 2006-042092 | 2/2006 |
| JP | 2006-086969 | 3/2006 |
| JP | 2006-311257 | 11/2006 |

* cited by examiner

*Primary Examiner* — Barbara Reinier
(74) *Attorney, Agent, or Firm* — Fitzpatrick, Cella, Harper & Scinto

(57) ABSTRACT

An information processing apparatus generates a combined LUT that performs color matching and color separation in an integrated manner, based on an LUT for color matching and an LUT for color separation. Input points of the combined LUT are set such that output corresponding to the input points of the combined LUT corresponds to input points of the LUT for color separation.

7 Claims, 14 Drawing Sheets

METHOD OF GENERATING COMBINED LOOK-UP TABLE, AND IMAGE PROCESSING APPARATUS AND IMAGE FORMING APPARATUS

BACKGROUND OF THE INVENTION

1. Field of the Invention

The present invention relates to technology which generates a single look-up table by combining a look-up table for color matching and a look-up table for color separation that are used by an image processing apparatus.

2. Description of the Related Art

When forming an image on a printing medium using an image forming apparatus, if color component data representing the image to be printed and color component data that can be interpreted by the image forming apparatus are different, it is necessary to convert the color component data. Converting the color component data includes, for example, performing color matching processing, converting a color space that represents the image (for example, converting from a RGB color space to a CMYK color space; referred to as "color separation processing"), gamma correction, and converting the number of tones of the color component data. In some cases deterioration in image quality occurs due to various factors when converting the color component data.

Japanese Patent Laid-Open No. 9-294212 discloses technology that reduces deterioration in image quality caused by a quantization error that occurs when reducing the number of tones of image data using an LUT (look-up table). According to the technology disclosed in Japanese Patent Laid-Open No. 9-294212, an LUT is provided such that intervals between lattice points become smaller if the density is lowered for a color space of color component data that represents image data.

Color matching processing and color separation processing can be performed using respectively different LUTs. In contrast, by using a single LUT (hereunder, referred to as "combined LUT") in which an LUT for color matching and an LUT for color separation are combined, color matching processing and color separation processing may be performed at the same time.

A conventional combined LUT will now be described by referring to FIG. 9 to FIG. 13.

FIG. 9 is a view that conceptually illustrates an LUT for color matching processing. In FIG. 9, each lattice point indicates a sample point (input point) of the LUT. FIG. 10 is a conceptual diagram when FIG. 9 is viewed from a gray axis (axis where R=G=B). At the time of color matching processing for image formation, in general the area of L* in the L*a*b* color system is compressed. Therefore, in FIG. 10, the gradient decreases in a dark portion and in a light portion (a portion in which an input value is small and a portion in which an input value is large).

FIG. 11 is a view that conceptually shows an LUT for color separation processing. FIG. 12 is a conceptual diagram of FIG. 11 when viewed from the gray axis. Although the relation between input values and output values is originally as shown by the solid line (curve) in FIG. 12, for an input value that is other than a sample point, a linearly interpolated value as shown by the dashed line in FIG. 12 is output. Therefore, as shown in FIG. 12, sample points are set at intervals that grow smaller as the area of the gradient of curve increases, so that an interpolation error is smaller.

FIG. 13 is a view that conceptually illustrates an interpolation error caused by an interpolation interval of a 3D-LUT after combination according to the conventional method. FIG. 13 illustrates a case in which points obtained by inputting output values (32, 128, 211) obtained from interpolation sample points of a color matching table into a color separation table are linearly interpolated as sample points. In the figure, it is found that an interpolation error with the original color separation table is large between the input values 32-128 in particular. Because of this error, there is a problem that, in color separation processing, adjustment of a slight ink amount of a gray component is thrown out of balance.

As described above, when performing color matching processing and color separation processing using a conventional combined LUT, there is a problem that there are large interpolation errors and the image quality of the image to be formed deteriorates.

Further, although the technology disclosed in Japanese Patent Laid-Open No. 9-294212 takes into consideration decreasing interpolation errors when using a single LUT, it does not take into consideration generating a combined LUT with small interpolation errors.

Furthermore, as a method for solving the problem whereby interpolation errors are generated as described using FIG. 13, although errors can be made smaller by increasing the number of sample points of a combined LUT and a deterioration in image quality can thereby be reduced, the data amount of the combined LUT increases. An increase in the data amount of the combined LUT becomes a particularly serious problem, for example, in a case in which an image forming apparatus with a limited memory capacity performs color matching processing and color separation processing.

The present invention was made in view of the above circumstances. That is, a feature of the present invention is to provide technology that reduces a deterioration in image quality of an image to be formed while suppressing an increase in a data amount of a combined LUT when generating a single combined LUT by combining a LUT for color matching and a LUT for color separation.

SUMMARY OF THE INVENTION

According to an aspect of the present invention, there is provided a method of generating a combined look-up table for converting a first color component data into a third color component data by combining a first look-up table for converting by color matching the first color component data that is generated and input by a first apparatus, and represented in a first color space into a second color component data that is represented in the first color space taking into consideration color reproduction characteristics of a second apparatus, and a second look-up table for converting by color separation the second color component data into the third color component data that is represented in a second color space used by the second apparatus, comprises a step of generating a combined look-up table in which color component data after color separation that corresponds to each input point of the second look-up table is made to correspond with corresponding color component data before color matching in a case in which each piece of color component data corresponding to each input point of the second look-up table is taken as color component data obtained using the first look-up table.

Further features of the present invention will become apparent from the following description of exemplary embodiments with reference to the attached drawings.

DESCRIPTION OF THE EMBODIMENTS

Preferred embodiments of the present invention will now be described with reference to attached drawings. Each embodiment described below will be helpful in understanding a variety of concepts from the generic to the more specific.

It should be noted that the technical scope of the present invention is defined by claims, and is not limited by each embodiment described below. In addition, not all combinations of the features described in the embodiments are necessarily required for realizing the present invention.

First Embodiment

Figure 1:
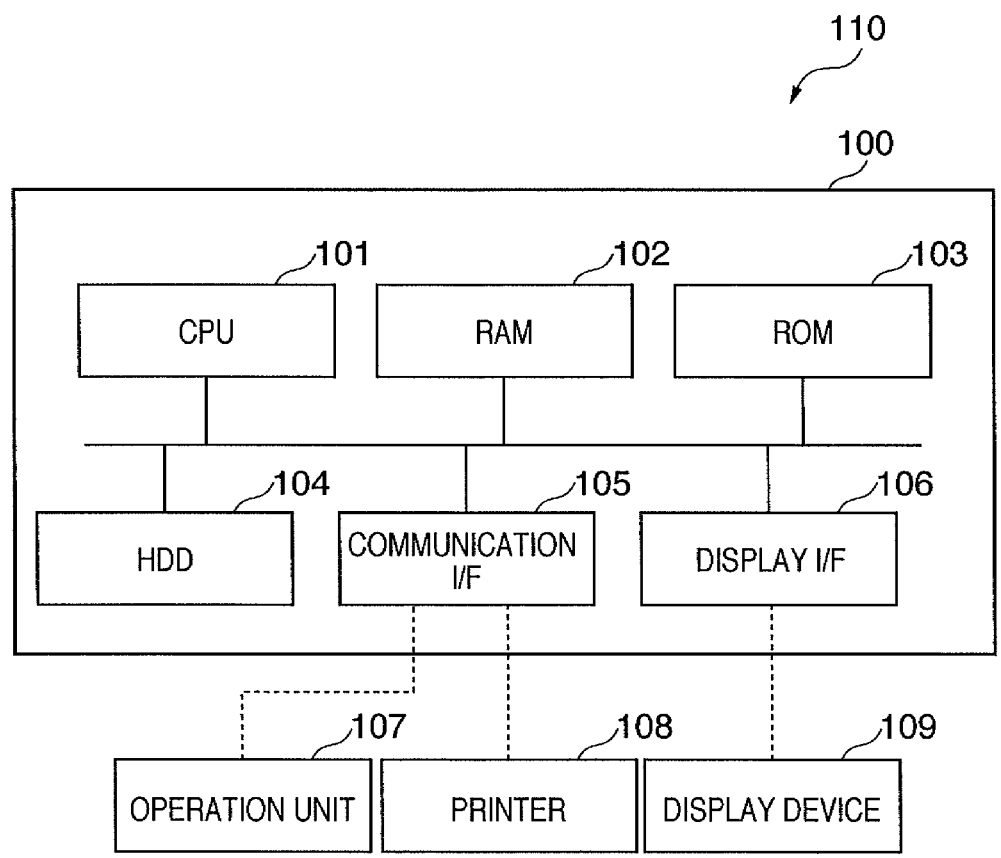
FIG. 1 is a view illustrating a print system according to the embodiments.

According to the present embodiment, a case is described in which an image is printed using the print system 110 shown in FIG. 1.

A personal computer (PC) 100 is one example of an image processing apparatus that converts color component data. A CPU 101 controls each component of the PC 100 by executing an operating system (OS), application programs, device drivers, and the like. A RAM 102 is a memory that functions as a work area of the CPU 101. A ROM 103 is a memory that stores startup programs etc. such as a BIOS and the like.

A hard disk drive (HDD) 104 is a storage device that stores computer programs such as an application program, an OS, and various device drivers, as well as a test pattern image for a printer or image data to be printed, and the like. A communication I/F 105 is an interface such as a USB, an IEEE 1394, a wired LAN, or a wireless LAN. The communication I/F 105 performs data communication with an external device such as a printer 108. A display I/F 106 is an interface for sending image information or the like to a display device 109 that is connected to (or integrated with) the PC 100.

An operation unit 107 includes a pointing device or a key input device and the like. The PC 100 receives instructions from a user through the operation unit 107.

The printer 108 is an image forming apparatus that forms an image on a printing medium by an inkjet method or a laser beam method. Although in this case the printer 108 is taken as an apparatus that uses binarized CMYK data for forming an image, the present invention is not limited thereto. For example, the printer 108 may use binarized CMY data (color component data for CMY color spaces) or may use multi-level color component data.

The display device 109 is a liquid crystal display or the like for displaying an image or the like.

In FIG. 1, although the PC 100 and the printer 108 are shown as respectively independent devices, a configuration may be adopted in which these two devices are integrated. For example, the printer 108 may comprise the same image processing function as the PC 100 and may convert color component data. Thus, for example, a printer that can perform so-called "direct printing" by connecting a digital camera can also perform color matching processing and color separation processing using the combined LUT (look-up table) according to the present embodiment.

Figure 2:
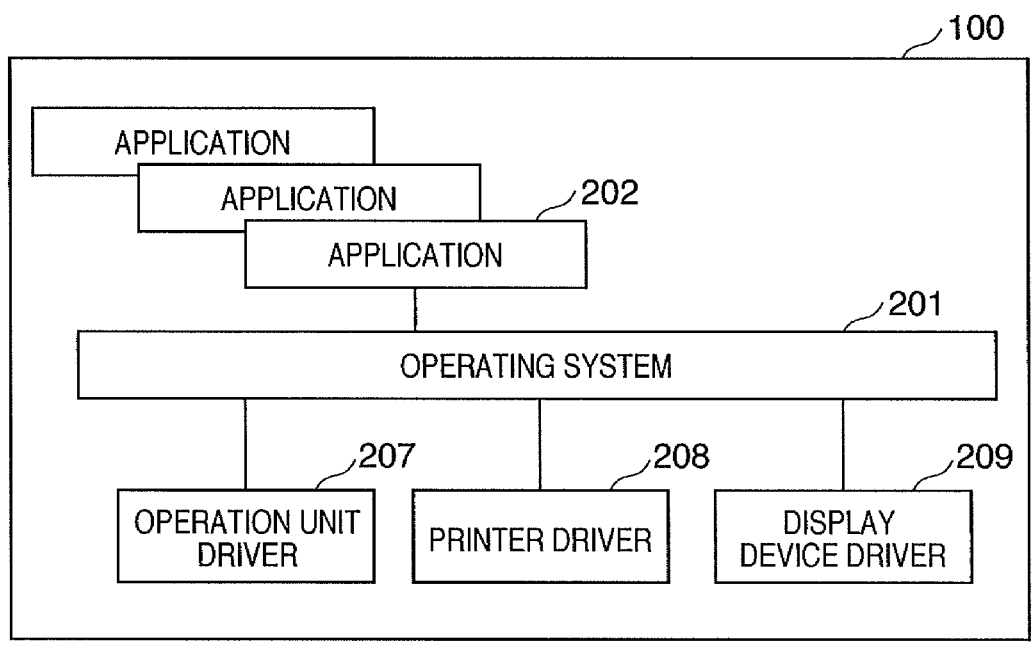
FIG. 2 is a view illustrating one example of the configuration of software that is executed on a PC according to the embodiments.

FIG. 2 is a view that shows one example of the configuration of software that is executed at the PC 100.

In FIG. 2, an OS 201 is an operating system that controls the PC 100. Applications 202 are, for example, image editing software and document creation software and the like. An operation unit driver 207 is a device driver for controlling the operation unit 107. A printer driver 208 is a device driver for controlling the printer 108. A display device driver 209 is a device driver for controlling the display device 109.

Hereunder, the processing that is conducted when the PC 100 instructs the printer 108 to print an image is briefly described by referring to FIG. 2.

For example, an application 202 such as image editing software makes a print request to the OS 201. Upon receiving the print request from the application 202, the OS 201 issues a print instruction to the printer driver 208 corresponding to the printer that will execute printing. At this time, for example, image data that is represented by RGB data is sent from the application 202 to the printer driver 208 through the OS 201.

The printer driver 208 converts the RGB data into data that can be interpreted by the printer 108 (for example, binarized CMYK data) in accordance with the print instruction that is received from the OS 201, and outputs the converted data to the printer 108. More specifically, for example, when the printer 108 is a raster printer, the printer driver 208 sequentially performs image correction processes for the image data in accordance with the print instruction from the OS 201. The printer driver 208 then, for example, sequentially rasterizes the corrected image data on an RGB 24-bit page memory (the number of bits is one example, and is not limited to 24 bits). After rasterization of the image data is completed, the printer driver 208 converts the contents of the RGB 24-bit page memory into a data format capable of being interpreted by the printer 108 (for example, binarized CMYK data) and outputs the data to the printer 108.

Figure 3:
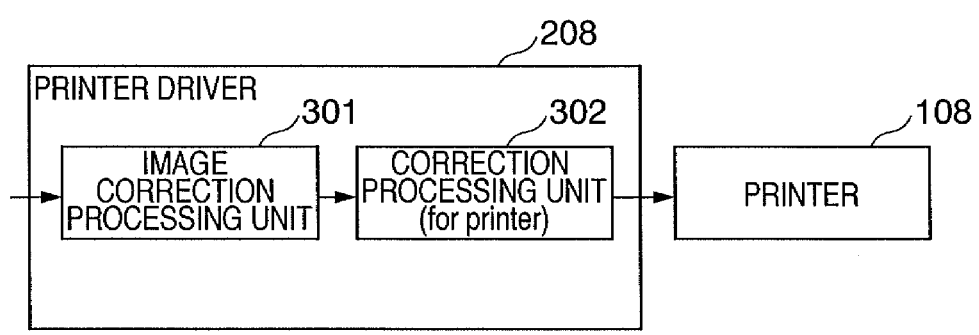
FIG. 3 is a view illustrating the details of image processing (conversion of color component data) performed by a printer driver of a PC according to the embodiments.

FIG. 3 is a view illustrating the details of image processing (conversion of color component data) performed by the printer driver 208.

An image correction processing unit 301 performs correction processing for the image data received from the OS 201. More specifically, for example, the image correction processing unit 301 converts R, G and B color information of the image data into brightness and color difference signals, performs exposure correction processing for the brightness signal, and then performs inverse conversion of the corrected brightness and color difference signals into R, G and B color information. Each piece of RGB 8-bit image data that the image correction processing unit 301 outputs corresponds to a color to be reproduced on the display device 109. For example, for coordinate values of a CIE L*a*b* color system that is a uniform color space, the image data represents the colors (L_Monitor, a_Monitor, b_Monitor).

A correction processing unit 302 for a printer rasterizes the image data and expands the raster image on a RGB 24-bit page memory. Further, the correction processing unit 302 for a printer performs color matching processing that executes color reproduction space mapping, color separation processing into C, M, Y and K, gamma correction processing, halftone processing, thus generating C, M, Y and K data that conforms with the color reproducibility of the printer for each pixel of the image data, and outputs the C, M, Y and K data to the printer 108.

Figure 4:
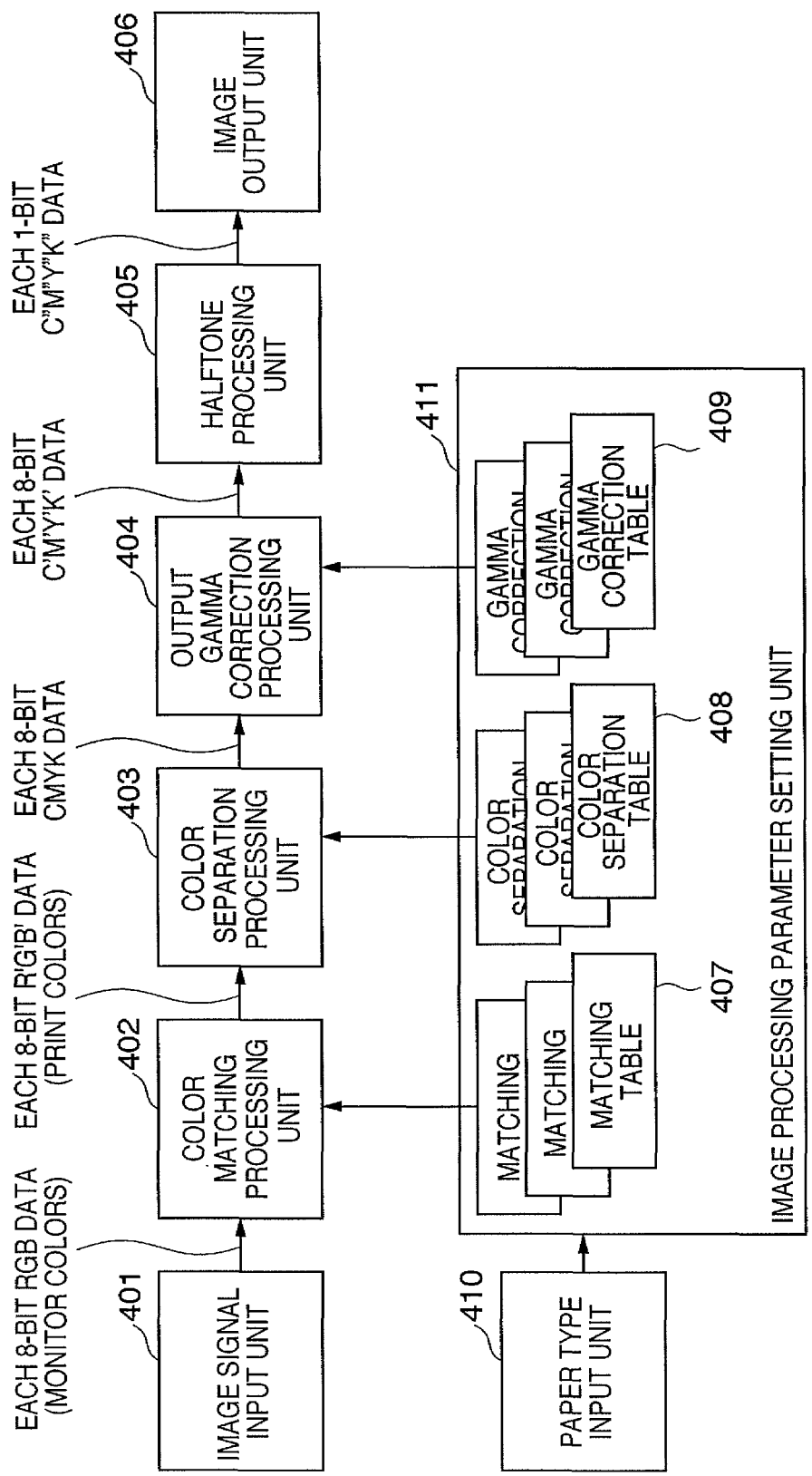
FIG. 4 is a view illustrating the details of processing performed by a correction processing unit (for a printer) of the printer driver.

FIG. 4 is a view illustrating the details of processing performed by the correction processing unit 302 for a printer. Hereunder, to simplify the description, a color space that is normally represented in three dimensions is schematically represented in two dimensions (see FIG. 5 and the like).

In FIG. 4, although a color matching processing unit 402 and a color separation processing unit 403 are displayed separately for the purpose of description, the correction processing unit 302 for a printer according to the present embodiment performs color matching processing and color separation processing using a combined LUT. Therefore, as described in detail later, the color matching processing unit 402 and the color separation processing unit 403 are integrated. Further, an output gamma correction processing unit 404 may also be integrated with the color matching processing unit 402 and the color separation processing unit 403.

An image signal input unit 401 receives image data that has been corrected by the image correction processing unit 301, and passes the data to the color matching processing unit 402.

The color matching processing unit 402 adjusts the consistency of the color reproduction space of the printer 108 and the color reproduction space of the display device 109. More specifically, by executing compression for an unreproducible region with the printer 108, the color reproduction space (monitor gamut) of the display device 109 is associated with points inside the color reproduction space (printer gamut) of the printer 108. Thus, each piece of 8-bit RGB data is converted into pieces of 8-bit R'G'B' data that corresponds to points on the printer color reproduction space. This is described specifically hereunder by referring to FIG. 5 and FIG. 6.

Figure 5:
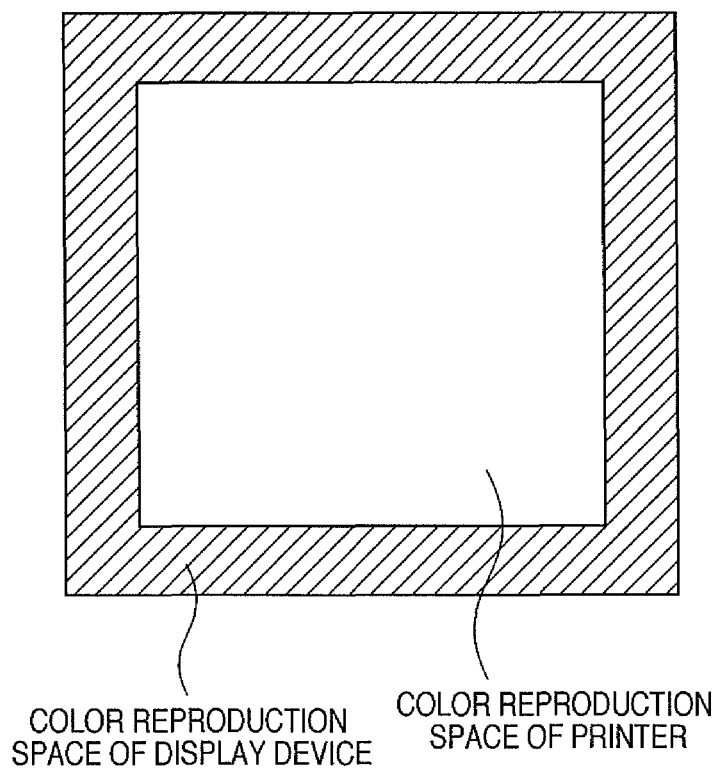
FIG. 5 is a view that schematically shows a difference between a color reproduction space of a printer according to the embodiments and a color reproduction space of a display device according to the embodiments.

FIG. 5 is a view that schematically shows a difference between a color reproduction space of the printer 108 and a color reproduction space of the display device 109. As described above, the image data corresponds to colors to be reproduced on the display device 109 and, for example, represents colors (L_Monitor, a_Monitor, b_Monitor) for the L*a*b* color system.

However, as will be understood from FIG. 5, the color reproduction space of the display device 109 and the color reproduction space of the printer 108 do not match on a uniform color space such as, for example, the L*a*b* color system. Therefore, a region that is on the inner side of the color reproduction space of the display device but is outside the color reproduction space of the printer as shown in FIG. 5 (diagonal-line portion), does not properly undergo image formation at the printer 108.

More specifically, a case may be considered in which, as described later, image data that is represented on the display device 109 undergoes RGB-CMYK conversion at the color separation processing unit 403, gamma correction processing at the output gamma correction processing unit 404, and binarization processing at a halftone processing unit 405. In this case also, there is a possibility that a region for which image formation is not properly performed, i.e. a region on the color space that cannot be represented at the printer 108 (diagonal-line portion in FIG. 5) may occur in the image data that is output from the image output unit 406 to the printer 108.

Accordingly, it is necessary that the printer 108 performs image formation with pseudo colors (L*a*b* values), i.e. pseudo colors that differ from the coloring of the display device 109, with respect to a region on the color space that is reproducible by the display device 109 and is not reproducible by the printer 108 (diagonal-line portion of FIG. 5).

Hereunder, as one example of color matching processing, a case is described in which an L*a*b* space as a uniform color space is converted into HSV space as a cylindrical coordinate system, and compression of the color space is performed for the HSV space. In this connection, conversion to HSV space is performed using the conversion formula H=a tan(b/a), S=sqrt(a*2+b*2), V=L*. In this case, a tan(x) is a function for calculating an arc tangent of x. Further, sqrt (x) is a function for determining $\sqrt{x}$.

The color matching processing unit 402 performs processing so that a gamut (monitor gamut) produced by RGB at the display device 109 on an L*a*b* space enters inside a gamut (printer gamut) produced by RGB at the printer 108. More specifically, for example, the color matching processing unit 402 compresses the monitor gamut by performing processing that lowers the saturation S while maintaining a brightness L* or the like.

Figure 6:
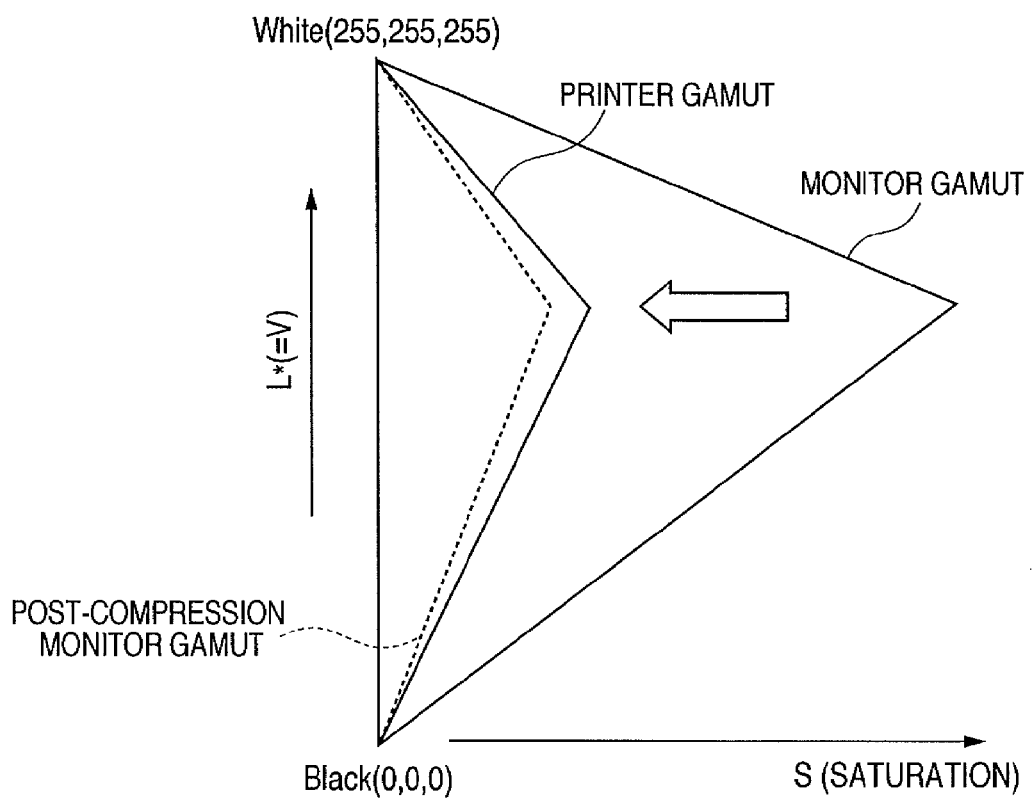
FIG. 6 is a view that conceptually illustrates gamut compression towards the saturation (S) direction on an SV plane.

FIG. 6 is a view that conceptually shows gamut compression towards the saturation (S) direction on an SV plane. By this processing, a set of L*a*b* values in the printer gamut are obtained that correspond to RGB values at the display device 109. More specifically, the post-compression monitor gamut is made to fit into the printer gamut. For example, taking L*a*b* values as a key, sets of the monitor (R, G, B) and the printer (R', G', B') are determined so that a color difference ΔE (=sqrt((L*'−L*)$^2$+(a*'−a*)$^2$+(b*'−b*)$^2$)) is minimized. It is thereby possible to obtain R'G'B' values at the printer that correspond to RGB values at the display device 109.

The R', G', B' values obtained in this manner are sent to the color separation processing unit 403 as the result of color matching processing.

In this connection, the above described color matching processing can also be implemented using an LUT. More specifically, the color matching processing unit 402 converts RGB values of the input image data into R'G'B' values for the printer 108 by referring to the LUT. Since the size of a printer gamut will differ according to the type of printing medium (such as paper), according to the present embodiment an image processing parameter setting unit 411 holds a plurality of matching tables 407 as an LUT for each printing medium. The color matching processing unit 402 selects a matching table 407 based on a paper type (kind of printing medium) that is obtained from a paper type input unit 410.

Next, color separation processing is explained.

The color separation processing unit 403 converts RGB data (more exactly, R'G'B' data that is the output from the color matching processing unit 402) into CMYK data.

As a conversion method for converting R'G'B' data into CMYK data, for example, a method that uses color masking is known. A color conversion method that uses color masking is shown in the following formulas.

$$Dr = -\log(R/255)$$
$$Dg = -\log(G/255)$$
$$Db = -\log(B/255)$$
$$\begin{pmatrix} C \\ M \\ Y \end{pmatrix} = \begin{pmatrix} 1 & m_r & y_r \\ c_g & 1 & y_g \\ c_b & m_b & 1 \end{pmatrix}^{-1} \begin{pmatrix} D_r \\ D_g \\ D_b \end{pmatrix}$$

By computing these formulas, the CMY values are obtained. In this connection, various methods are available as methods of determining a signal value of K (black). For example, it is possible to substitute a vector [Dr−K Dg−K Db−K]t obtained by subtracting K values from the respective vector elements for the rightmost side of the above determinant. Subsequently, by obtaining a masking matrix by trial and error while restricting the K value by utilizing the condition that the CMY color signal values corresponding to the ink amount are always positive or zero, the value of K can be determined.

According to the present embodiment, it is assumed that the color separation processing unit 403 performs color separation processing using LUTs. Similarly to the color matching processing, the image processing parameter setting unit 411 holds a color separation table 408 for each printing medium in the form of an LUT.

CMYK data obtained by color separation processing is sent to the output gamma correction processing unit 404.

The output gamma correction processing unit 404 performs gamma correction processing in order to compensate for non-linear characteristics with respect to brightness of the printer 108, and converts CMYK data to C'M'Y'K' data. The output gamma correction processing unit 404 refers to an LUT for each color component to perform gamma correction processing. Similarly to the color matching processing, the image processing parameter setting unit 411 holds gamma correction tables 409 for each printing medium in the form of an LUT.

The halftone processing unit 405 converts multiple value (for example, 8 bits for each color) C'M'Y'K' data into binary C"M"Y"K" data that can be printed by the printer 108 and performs halftone processing.

One method of performing this halftone processing involves of respectively applying, for example, a Bayer-type 16×16 matrix to C'M'Y'K' images that are input. Subsequently, the halftone processing is realized by assigning 1 when a pixel value on the corresponding image is larger than an element on the matrix, and assigning 0 when the pixel value is less than an element on the matrix. Another halftone processing method such as an error diffusion method can also be used.

Each piece of 1-bit C"M"Y"K" data that the printer 108 is capable of printing that is obtained in this manner is sent to the printer 108 and formed as an image on a printing medium.

<Generation of Combined LUT>

Next, the method of generating a combined LUT from the matching table 407 and the color separation table 408 is described. As described above, according to the present embodiment the color matching processing unit 402 and the color separation processing unit 403 (see FIG. 4) are integrated, and the correction processing unit 302 for a printer (see FIG. 3) refers to the combined LUT to convert RGB data to CMYK data. Conversion from RGB data to CMYK data is one example of conversion and, for example, the combined LUT may convert RGB data into CMY data.

Figure 14:
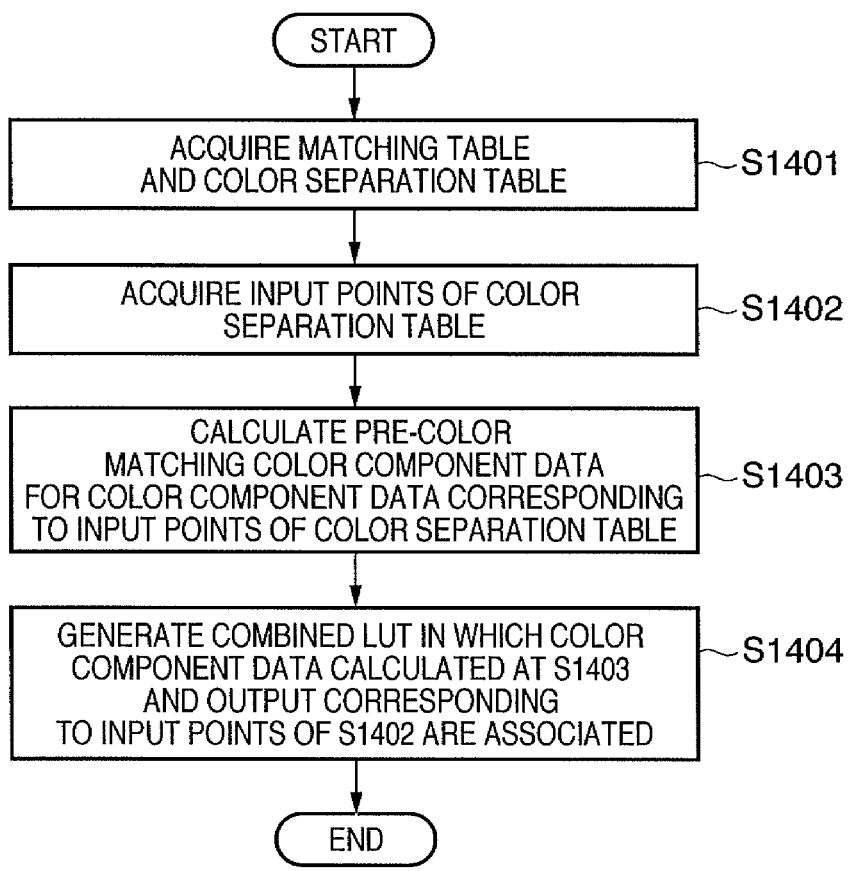
FIG. 14 is a flowchart showing the flow of processing which generates a combined LUT from a matching table and a color separation table of a correction processing unit for a printer.

FIG. 14 is a flowchart showing the flow of processing which generates a combined LUT from the matching table 407 and the color separation table 408. The processing that generates the combined LUT can be performed by an arbitrary information processing apparatus that can execute the processing of each step of FIG. 14 (for example, the PC 100 shown in FIG. 1). Hereunder, a case is described in which the PC 100 generates the combined LUT.

At step S1401, the PC 100 acquires the matching table 407 and the color separation table 408. The matching table 407 and the color separation table 408 are, for example, sent to the PC 100 via the communication I/F 105. Alternatively, the information processing apparatus may generate the matching table 407 and the color separation table 408 in an not-shown step, the tables may then be stored in a storage device such as the HDD 104, and acquired from the storage device.

At step S1402, the PC 100 acquires color component data (R'G'B' data) corresponding to each input point of the color separation table 408.

Figure 7:
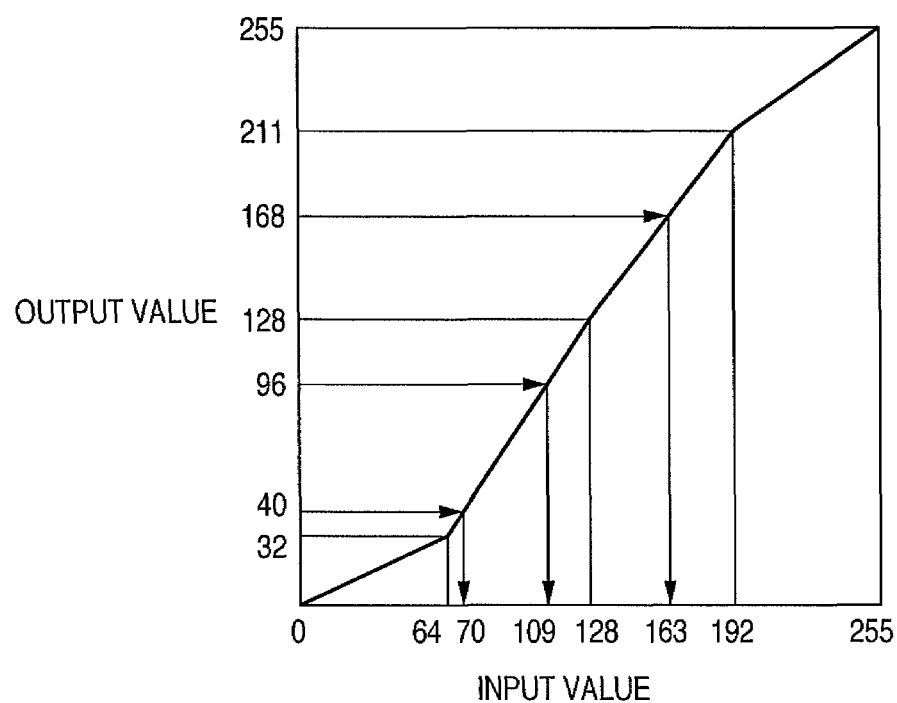
FIG. 7 is a conceptual diagram of calculation processing at step S1403 of FIG. 14.

At step S1403, taking each piece of color component data acquired at step S1402 as the output at the matching table 407, the PC 100 calculates the corresponding color component data (RGB data) prior to color matching. FIG. 7 is a conceptual diagram of the calculation processing at step S1403. When the concept illustrated in FIG. 7 is applied in a 3D-LUT, computation of an input value (RGB) corresponding to a certain output value (RGB) is determined. More specifically, the output value (RGB) is compared with a value on an output side of the 3D-LUT, and sample points are specified as the tops of hexahedrons (elliptical cubes) comprising quadrangles surrounding points at which the output values (RGB) are positioned in the color spaces. Common tetrahedral interpolation is then performed using these sample points to determine the input values (RGB).

At step S1404, the PC 100 generates the combined LUT. More specifically, first, the PC 100 takes each piece of color component data calculated at step S1403 as an input point. The PC 100 then acquires color component data (CMYK data) obtained by subjecting the corresponding color component data after color matching (color component data acquired at step S1402) to color separation using the color separation table 408. Taking this color component data (CMYK data) as the output, the PC 100 then associates therewith the corresponding respective pieces of color component data calculated at the step S1403 as input points to form the combined LUT.

The PC 100 performs the above described processing of steps S1401 to S1404 for the matching tables 407 and the color separation tables 408 corresponding to all the types of papers to be handled by the paper type input unit 410 of the correction processing unit 302 for a printer. The PC 100 thereby generates a combined LUT that corresponds to all types of papers to be handled by the paper type input unit 410.

Figure 8:
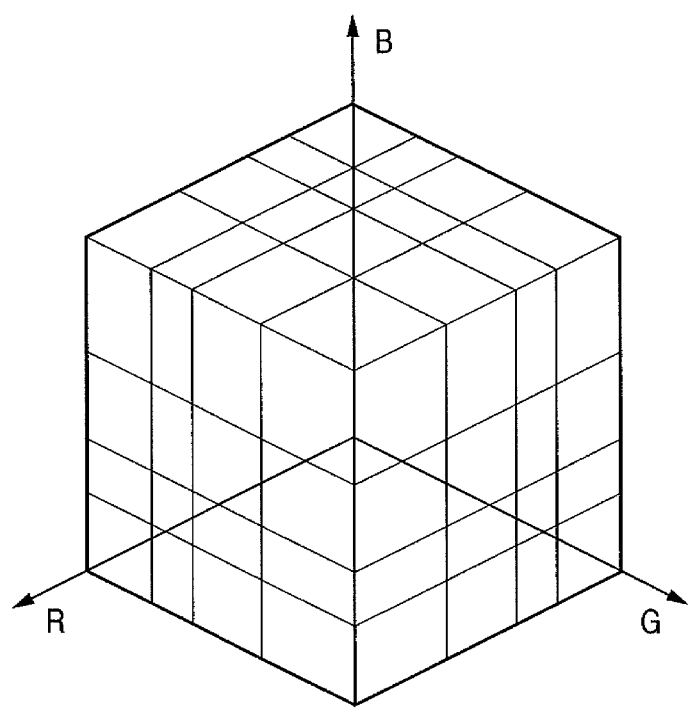
FIG. 8 is a conceptual diagram of a combined LUT according to the embodiments.
Figure 9:
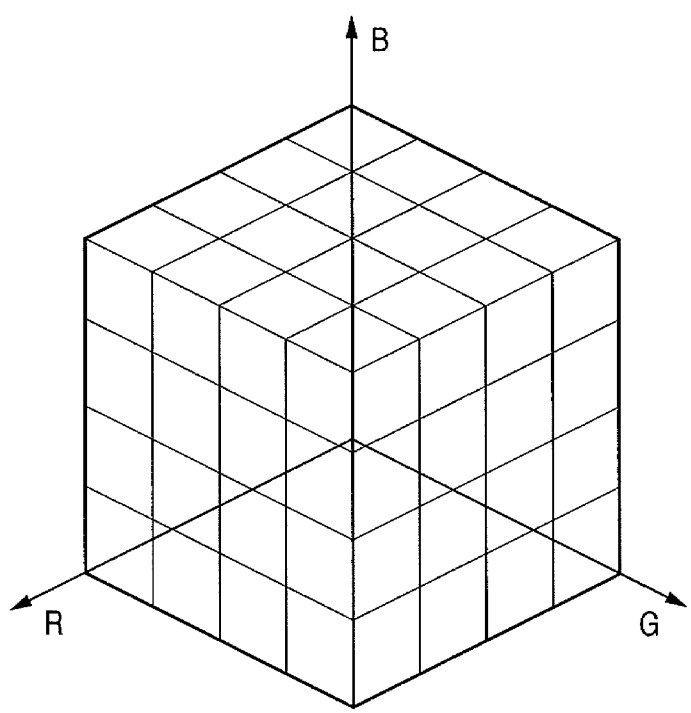
FIG. 9 is a view that conceptually shows an LUT for color matching processing.
Figure 10:
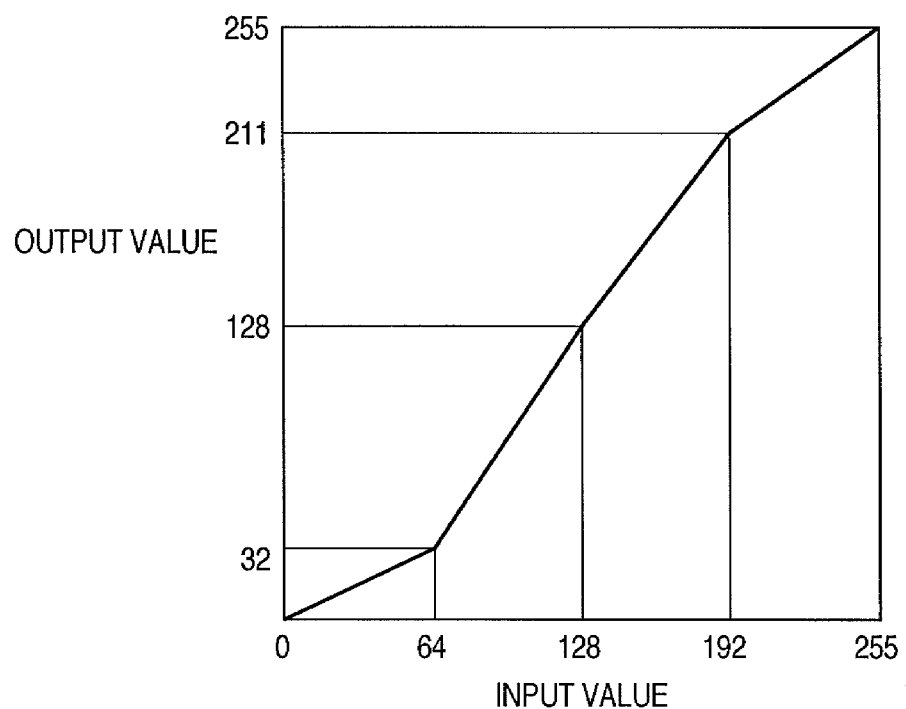
FIG. 10 is a conceptual diagram showing FIG. 9 when viewed from the gray axis (axis of R=G=B)
Figure 11:
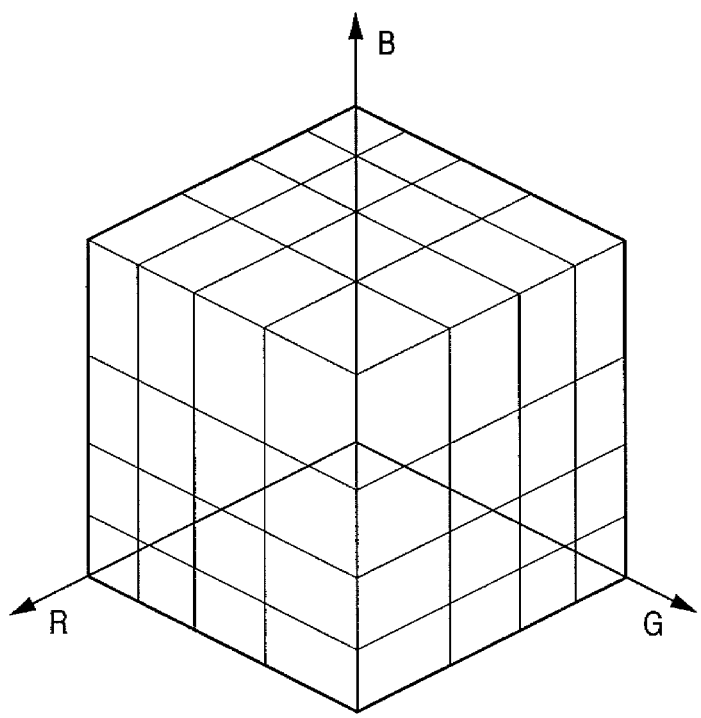
FIG. 11 is a view that conceptually shows an LUT for color separation processing.
Figure 12:
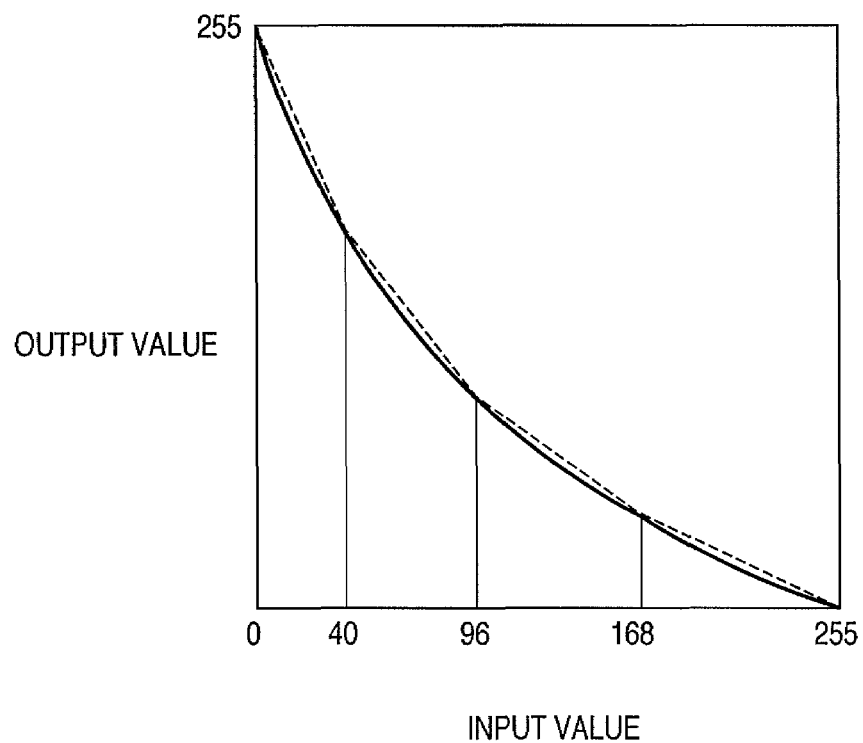
FIG. 12 is a conceptual diagram of FIG. 11 when viewed from the gray axis.
Figure 13:
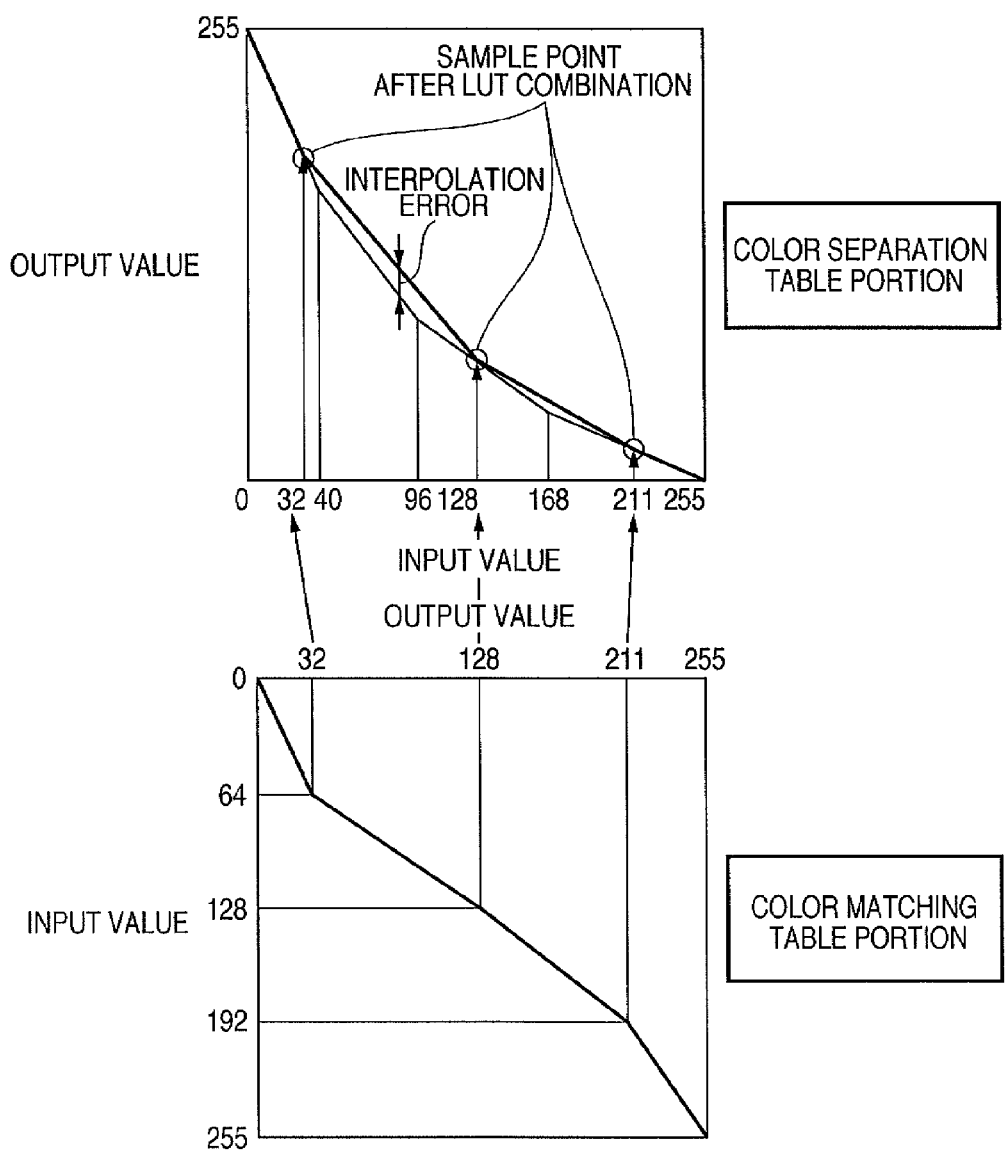
FIG. 13 is a conceptual diagram of a conventional combined LUT when viewed from the gray axis.

A conceptual diagram of the combined LUT that is obtained in this manner is shown in FIG. 8.

As described above, according to the present embodiment, the information processing apparatus generates a combined LUT that performs color matching and color separation in an integrated manner based on an LUT for color matching and an LUT for color separation. The input points of the combined LUT are set such that the output that corresponds to the input points of the combined LUT corresponds to input points of the LUT for color separation.

Thus, when generating a single combined LUT by combining an LUT for color matching and an LUT for color separation, it is possible to reduce deterioration in the image quality of an image to be formed, while suppressing an increase in the data amount of the combined LUT.

Other Embodiment

The processing described in the above embodiments may be realized by providing a storage medium, storing program codes of software realizing the above-described functions, to a computer system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. The storage medium, such as a Floppy® disk, a hard disk, an optical disk, a magneto-optical disk and the like can be used for providing the program codes. Also, CD-ROM, CD-R, a magnetic tape, a non-volatile memory card, ROM, and the like can be used.

Furthermore, the functions according to the above embodiments are realized not only by executing the program codes read by the computer. The present invention also includes a case where an OS (operating system) or the like working on the computer performs part or the entire processes in accordance with designations of the program codes and realizes the functions according to the above embodiments.

Furthermore, the program codes read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-344667, filed on Dec. 21, 2006, which is hereby incorporated by reference herein in its entirety.

What is claimed is:

1. A method of generating a combined look-up table based on first and second look-up tables wherein:

each of the first, second, and combined look-up tables includes a plurality of grid-point data, and each of the plurality of grid-point data includes an input value and an output value corresponding to the input value;

the first look-up table is a table for converting a first color component data represented in a first color space into a second color component data represented in the first color space;

the second look-up table is a table for converting the second color component data into a third color component data represented in a second color space;

the combined look-up table is a table for converting the first color component data into the third color component data; and the method comprises:

a calculating step of calculating an input value of the combined look-up table so that the calculated input value is input to the first look-up table, and an output value is output which corresponds to the input value of one of grid-point data of the second look-up table; and a setting step of setting an output value for grid-point data of the combined look-up table by using the output value of said one of grid-point data of the second look-up table, and setting an input value for the grid-point data of the combined look-up table by using the input value calculated in the calculating step.

2. The method according to claim 1, wherein the first color space is an RGB color space.

3. The method according to claim 1, wherein the second color space is a CMY color space or a CMYK color space.

4. An image processing apparatus that performs color matching and color separation using a combined look-up table that is generated by a method according to claim 1.

5. An image forming apparatus comprising an image processing unit that performs color matching and color separation using a combined look-up table that is generated by a method according to claim 1.

6. A non-transitory computer-readable storage medium on which a computer program is recorded, the program for causing a computer to execute a method according to claim 1.

7. The method according to claim 1, wherein at least one of the input values of the plurality of grid-point data included in the second look-up table is different from any of the output values of the plurality of grid-point data included in the first look-up table.

* * * * *